Oct. 17, 1967     B. L. ADAMS     3,347,224
APPARATUS AND METHOD FOR MEASURING CARDIAC OUTPUT
Filed May 26, 1964
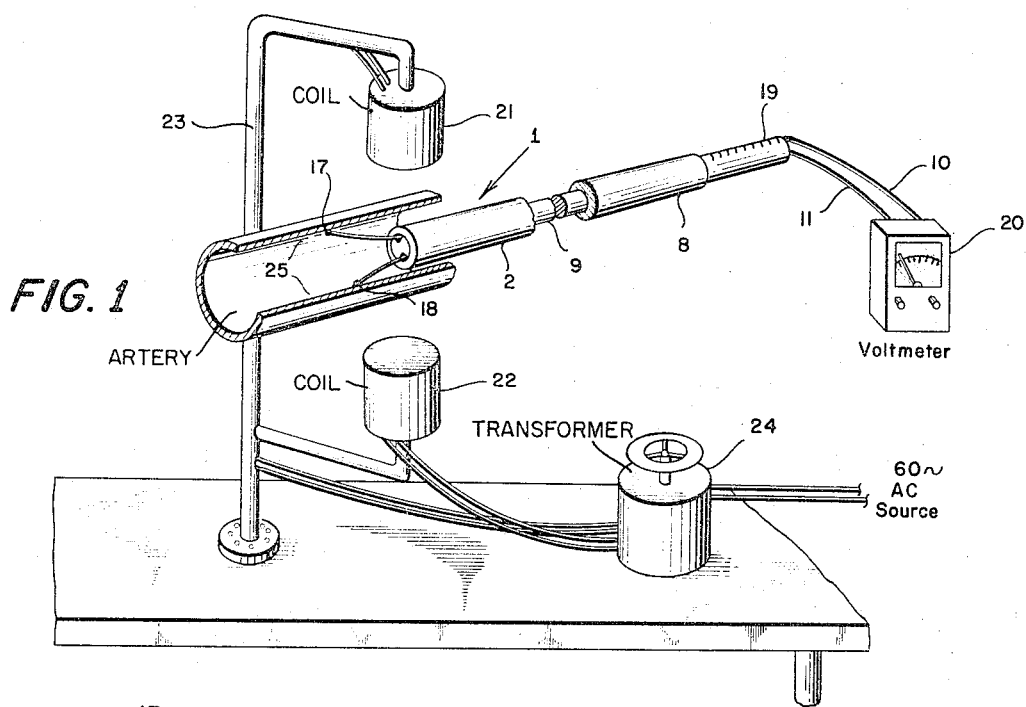
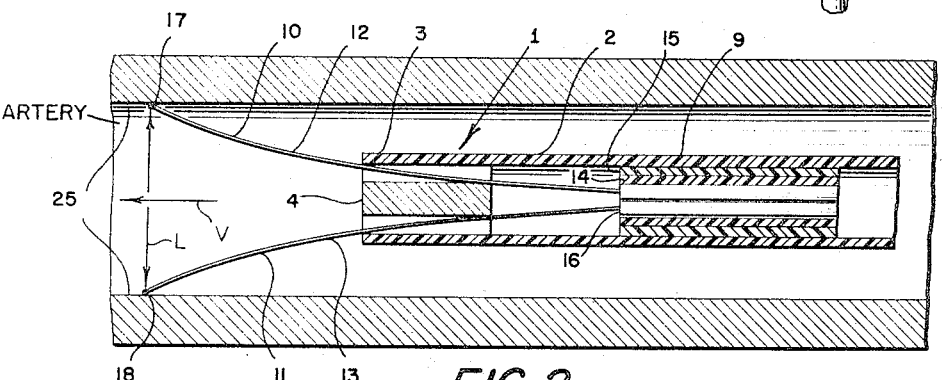
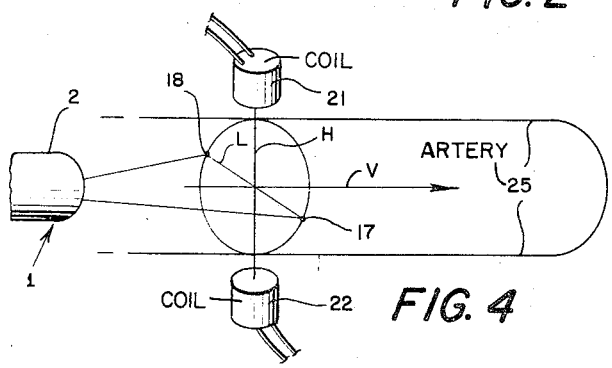
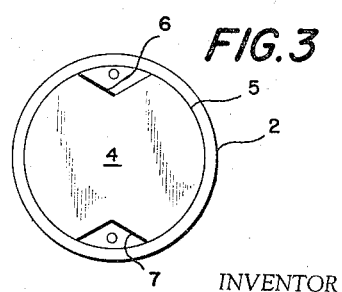
INVENTOR
BRANDON L. ADAMS
BY *Edmund M. Jaskiewicz*
ATTORNEY _United States Patent Office_

3,347,224
Patented Oct. 17, 1967

3,347,224
APPARATUS AND METHOD FOR MEASURING CARDIAC OUTPUT
Brandon L. Adams, 1365 Limit Ave., Baltimore, Md. 21212
Filed May 26, 1964, Ser. No. 370,247
7 Claims. (Cl. 128—2.05)

The present invention relates to the measurement of cardiac output, more particularly to an apparatus and method for the determination of the rate of blood flow through a vessel by inducing an EMF by the blood flowing through the vessel at this point.

The cardiac output may be defined as the quantity of blood expelled by the heart each minute. This is equal to the flow of blood through the entire body per minute. This value is one which many investigators have sought an accurate but uncomplicated way to measure. At the present time, many methods exist to afford an experimental estimate of this value; however, few of them are as highly accurate as desired, and most of them are complex and uncomfortable to the subject.

Ever since man has achieved his present concept of the circulatory system; that is a dynamic concept of afferent and efferent channels carrying blood from peripheral sites to a central pump, through an oxygenation system and then redistributed to the peripheral sites by this pump, he has found it increasingly more important to objectively evaluate the effectiveness of this system. Heart disease is the most prominent cause of non accidental human mortality, and its incidence appears to be increasing. Medical and surgical techniques of treating various cardiac disorders are increasing, and therapeutic results today are far above any dreamed of not too many years ago. Practically, therefore, there is a growing challenge to more accurately describe individual cardiac function in terms of mathematical parameters which, when applied clinically, will enable the clinician to more accurately diagnose the pathologic entity, establish the exact status and risk factor of the patient to more intelligently guide the treatment. Nearly taken for granted are some of the old parameters for describing circulatory status such as blood pressure, pulse rate, heart rate, venous pressure, circulation time, EKG.

Since the advent of cardiac catheterization, new parameters have been added such as oxygenation of the blood in the various chambers and outflow tracts, and pressures in these same areas. Diagnosis and assessment of cardiac status are facilitated not only by use of these parameters, but also by other information obtained from the stethoscope and the X-ray. As yet, accurate knowledge of blood flow either through the heart itself or in any given peripheral channel is scanty, since only recently have methods become available to make such measurements. Knowing the actual value of flow through the heart or any given channel selected would tremendously enhance the accurate assessment of cardiac status, since it has been well pointed out that knowledge of pressure in any given flow system does not necessarily give accurate knowledge of flow. Thus, it would be tremendously advantageous to know how much blood is flowing from the right ventricle into the pulmonary tree and back again to the left atrium per unit time, as well as to demonstrate the pressure gradients that exist along this route, even though such gradients can now be assessed with a great deal of accuracy. It is therefore apparent that it would be extremely valuable to know cardiac output or flow values in any selected vascular highway in addition to what we already know.

Several ways have been devised in which investigators in the past have attempted to estimate the quantity of blood flowing through the heart per minute. Some of these procedures are applicable only on experimental animals since they require surgery too drastic for what is expected to be learned. Of all of the non surgical methods utilized, there are in general two categories of procedures. The first category is classified as primary in that it utilizes "calculations in which directly measured physical data are used without the introduction of empirical factors." There are many such primary tests, but they all appear to be a modification of one of two basic methods. By this classification, secondary tests are those tests in which empirical factors or formulae must play a part.

These procedures can be listed as follows:

*Surgical techniques on experimental animals not useable on humans*

(1) The plethysmograph
(2) The stromuhr
(3) The rotameter

*Nonsurgical techniques which can be used on humans*

(1) Fick principle
  a. Direct
  b. Indirect
(2) Dye dilution method

Both the Fick principle and the dye dilution method, with all of their variations, are examples of a "primary" nonsurgical technique applicable on humans. The following are several "secondary" techniques applicable on humans:

(1) The Ballistocardiograph;
(2) Measurement from arterial pulse pressure;
(3) Measurement by X-ray.

It is therefore the principal object of the present invention to provide a novel and improved apparatus and method for measuring cardiac output.

It is another object of the present invention to provide an apparatus and method for measuring accurately and safely the volume of blood flow per unit time in a living organism to determine the cardiac output in that organism.

It is a further object of the present invention to provide an apparatus and method for measuring the rate of blood flow through a vessel by measuring an EMF induced by the blood flowing through the vessel at this point.

It is still another object of the present invention to provide a novel and improved apparatus for measuring EMF induced as a result of blood flowing through an electro-magnet field established through the vessel and for measuring the internal diameter of the vessel at the point where the EMF is being measured.

The cardiac output in liters per minute is equal to the blood flow through the main pulmonary artery in liters per minute, since all the blood passing through the cardio-respiratory mechanism must pass through this channel in the normal compensating heart. Any method which could accurately and safely measure the volume of this blood flow per unit time in the living organism would automatically be measuring the cardiac output in that organism.

The principle proposed here is not a new one but rests upon Faraday's Law of Electromagnetic Induction which establishes a mathematical relationship between induced EMF and velocity of flow. A moving conductor C of length L in an electromagnetic field generates an EMF of value E; this EMF causes a current $i$ to flow through the wire during the time $dt$ in which the conductor is moved the distance $dx$. The work W is given by the equation:

$$W = Eidt$$

The force F acting on $i$ resulting from the magnetic field H which opposes the motion, is given by:

$$F = iLH$$

Since
$$W = Fdx$$
$$W = iLHdx$$

Equating the two values for work:
$$Edit = iLHdx$$

or
$$E = LH\frac{dx}{dt}$$

or
$$E = LHV \text{ (ohms per second)}$$

since
$$V = \frac{dx}{dt}$$

For fluid flow in a rigid pipe where the direction of flow, the magnetic intensity, and the electrodes are arranged so as to be mutually perpendicular, L becomes the internal diameter of the pipe, and V is the mean cross-sectional, instantaneous velocity of flow.

Since blood contains anions and cations, it has the physical properties of an electrical conductor as any ionized fluid has. Thus, if electrodes are immersed in a solution of blood and maintained at a different potential, a measurable current will flow through the solution as a result of ionic migrations to the oppositely charged electrodes. In like manner, if a vessel of blood is moved through the lines of force of a magnetic field, a current flows between the electrodes immersed in the vessel, since the ions will migrate in this system just as they did in the previous example. If magnetic lines of force can be made to cut perpendicularly across the path of blood flow in any vessel, an EMF will be induced between one side of the blood column and the other which is directly proportionate to the magnitude of the magnetic field, the velocity of blood flow, and the width of the vessel. If the cross-sectional area of the vessel were known, the product of this and the mean flow velocity would be the mean volume rate of flow.

The present invention discloses an apparatus and method to determine the instantaneous velocity of flow or the mean flow velocity, both of which are desirable, depending upon the nature of the investigation, in the main pulmonary artery by application of the above principle.

An apparatus is disclosed to impose a magnetic field, the strength of which is known, perpendicularly to the flow of blood in the main pulmonary artery, and to measure the EMF resulting from this flow. With the same apparatus, the internal diameter of the pulmonary artery throughout the cardiac cycle is measured, and the value of this diameter is known at any time a reading is taken of the induced EMF.

Referring back to the above equation, $$E = HLV$$

it is possible to solve for V by dividing both sides of the equation by HL. Dividing and transposing gives:

$$V = \frac{E}{HL}$$

Since L is measured by the instrument, H is known, and arbitrarily set in advance, and E is also measured by the instrument, it is possible to substitute the three known values and solve for V directly. Dividing L by two, squaring this value, and multiplying by Pi (3.1416), the cross-sectional area through which the blood is flowing is calculated. Multiplying this by V gives the volume rate of flow.

Since blood flow through the main pulmonary artery is pulsatile, the observed valve E will change continuously with time. Due to this pulsating flow, the pulmonary artery alternatively expands and collapses so that the value L will be constantly changing throughout the cycle. If, however, the instantaneous values of both E and L are plotted on the same tracing, one can solve for the instantaneous flow using the instantaneous but corresponding values of E and L at any time. By mathematical analysis of the tracings obtained, an average flow value over one minute's time can also be obtained in much the same way that average values are obtained when one examines the plot of an alternating current or any other rhythmically varying event. The average flow per unit time would be the cardiac output which is what was to be measured. Instantaneous values of and by themselves would be useful, however, since it would be known how much blood the right ventricle is pumping during any part of the cardiac cycle. Of course the assumption has been made above that the internal configuration of the artery is nearly a perfect circle, and in a healthy individual this assumption is warranted. Any set of conditions which alter this configuration such as an atheromatous plaque or an external tumor pressing on the vessel will introduce an error into the result. For the sake of greatest accuracy, such conditions should be known in advance if possible. However, when they exist and are not taken into account, a highly accurate approximation of the flow value should still be obtained.

The above equation relating velocity, magnetic field and flow is strictly true only when the magnetic field has an unvarying strength, H. This condition is realized in the DC electromagnetic field after the coil has been energized and a steady state is reached. This is also true if the magnetic field were emanating from a so called "permanent" magnet. For practical considerations it is undesirable to use a steady field but necessary to resort to a varying field which will modify the basic equation somewhat. It is necessary to avoid a steady field because of the phenomenon of polarization at the pickup electrode.

Magnetic flux is a vector quantity and is thus characterized by both magnitude and direction. The term H, therefore refers to direction as well as magnitude. If H is a constant, this means that the direction of flux with respect to blood flow remains steady and exerts an unchanging effect upon the moving ions in the blood. Therefore the cations, under the influence of a steady field H, would always migrate to one electrode and the anions always to the opposite. After a short time, there is a net accumulation of ions at each electrode due to inability of the external circuit to nullify their charge as rapidly as they migrate through the solution. When such an accumulation has occurred, further ions approaching that electrode through the solution are repelled by ions of the same charge at that locus. Finally, there is decrease and eventual disappearance of flow in the external circuit, and the system is no longer measuring.

The problem of polarization has been eliminated in another way. If one establishes a magnetic field which is constantly and rapidly alternating in direction, there is practically no polarization problem, since the ions in the blood migrate first toward one electrode and then to the opposite. Such an alternating magnetic field is established around an electromagnetic coil energized by alternating current. In the proposed apparatus, such a field is utilized. This means that the equation, $$E = HLV$$

is modified, since H is a function of the current I, producing the magnetic field, and time. Along the axis of a very long coil, the magnetic field H is given by equation, $$H = N_1 I$$

where $N_1$ is the number of coil turns per unit length of solenoid, and I is the instantaneous value of the current producing the magnetic field in each single turn of the coil. Instantaneous current in an alternating current sinusoidal circuit is given by the equation, $$I_i = I_m \sin(\omega t - \phi)$$

$I_m$ is the maximum current, $\omega$ is the angular velocity of the generator in radians per second, or $2\pi f$ where $f$ is the frequency in cycles per second, and $t$ is the time at which the measurement is taken. $\phi$ is the phase angle between the voltage and the current. Substituting this into the previous equation gives:

$$H_i = N_1 I_m \sin(\omega t - \phi)$$

Substituting this new value for H into the old equation gives:

$$E_i = N_1 I_m \sin(\omega t - \phi) LV$$

Carrying out the operation previously performed to solve for V gives:

$$V = \frac{E_i}{N_1 I_m \sin(\omega t - \phi)}$$

Thus it is seen that it is necessary to know the value of $H_i$ at any time if it is desired to literally solve the equation.

If there were no flow of blood, a voltage would still be induced in the blood, since relative motion exists between the blood and the magnetic field due to the changing nature of the field. The EMF induced under no flow condition caused by an alternating magnetic field is called the transformer induced EMF. The EMF induced by change in velocity of blood flow is called the flow induced EMF. Fortunately, the transformer induced EMF has been shown to vary from the flow induced EMF by 90° thus making separation and separate detection of the two signals possible.

It is sufficient to say that it will not be necessary to know the instantaneous value of H at a time when the other instantaneous values are known to make a valid reading, since a 90° phase difference exists.

In carrying out the present invention, essentially, a magnetic field must be imposed perpendicular to the blood flow through the main pulmonary artery. The EMF induced as a result of blood flowing through the magnetic field must then be measured and recorded. It is also necessary to measure the internal diameter of the vessel at the point where the EMF is being measured. Since cardiac catheterization has been established as a useful, practical, and safe diagnostic procedure, there is a means for gaining access to the interior of the main pulmonary artery.

The apparatus is essentially a probe installed in a cardiac catheter which can be advanced or retracted a certain distance beyond the end of the catheter when once this catheter is known to be in the main artery.

The measuring end of the cathete, i.e., the end within the vessel, is closed by a plug which has opposed longitudinal grooves on the peripheral surface. The probe comprises a pair of thin wires with the ends of the wires within the catheter having electrodes on the ends thereof and passing through the plug grooves when the probe is advanced within the catheter. Advancing the probe will cause the electrodes to be urged apart by the plug into spaced relationship until the electrodes contact the wall of the vessel.

A voltmeter is connected to the probe across the electrodes to measure the EMF induced between the electrodes by the flow of blood. An electromagnetic field is established across the vessel at the point where the electrodes contact the vessel wall by a pair of similar coils positioned on opposite sides of the vessel and connected to an AC source.

Other objects and advantages of the present invention will be apparent upon reference to the accompanying description when taken in conjunction with the following drawings, wherein:

FIGURE 1 is an overall perspective view of the apparatus of this invention showing the catheter and probe assembly within a vessel and positioned between the coils;

FIGURE 2 is a vertical sectional view of the catheter and probe assembly within a blood vessel;

FIGURE 3 is an elevational view of the measuring end of the catheter and probe assembly with the probe in the retracted position;

FIGURE 4 is a schematic view showing the vector relationships of the several values involved in this invention.

Returning now to the drawings wherein like reference symbols indicate the same parts throughout the several views, a specific embodiment of the present invention will be described in detail.

The catheter and probe assembly is indicated generally at 1 in FIGURES 1 and 2 and comprises a #8 French cardiac catheter 2 only a portion of which is shown. It is understood that the cardiac catheter is about 3 feet long and flexible.

One end 3 of the catheter is for insertion into the vessel and is designated the "measuring end." In this end 3 of the cardiac catheter there is inserted a plastic plug 4 which is snugly received therein. The peripheral surface 5 of the plug 4 is provided with opposed shallow V-shaped longitudinally extending grooves 6 and 7.

The outer end of the catheter is indicated at 8 and is designated the "recording end."

The probe is indicated at 9 and comprises two lengths 10 and 11 of piano wire each having a diameter of the order of 0.0001 inch and having very high tensile strengths. Each wire 10 and 11 is separately coated with an insulating layer 13 and 12, respectively, of a heat shrinkable plastic which has no effect on the human system. The outer surface of each insulating layer 12 and 13 is smooth. The layers extend over the entire lengths of the wires.

The insulated wires 10 and 11 are then positioned adjacent each other in parallel relationship or twisted around each other and then wrapped with a thin gold foil 14 which extends nearly the entire length of the wires. The foil shields the wires from extraneous electrical and magnetic disturbances such as EKG voltages. This foil, however, may be omitted.

A layer of a heat shrinkable plastic 15 is then placed around the foil layer. The entire diameter of the probe after the layers of gold foil 14 and plastic 15 is placed therearound is such that the probe is movable within the catheter with a minimum of clearance. The probe is sufficiently flexible to bend with the catheter as the catheter is passed from the peripheral vein to the heart from either a femoral or antecubital location.

At the measuring end of the probe, indicated at 16, the insulated wires 10 and 11 extend outwardly from the coaxial layers of foil 14 and insulation 15 for a distance of several centimeters. At the extreme ends of the wires 10 and 11 are electrodes 17 and 18 which may be drops of solder and have a diameter approximately equal to the diameter of the wires. The electrodes are not covered with any insulation.

As can be seen in FIGURE 2, the electrode ends of the wires 10 and 11 are positioned in the grooves 6 and 7 of the plastic plug. Advancing the probe 9 into the catheter 2 will cause the plug 4 to separate the wires 10 and 11 so that the distance between the electrodes 17 and 18 may be varied by positioning the probe within the catheter. A scale 19 is provided on the outer surface of the recording end of the probe. The scale 19 is calibrated so that the distance between the electrodes as determined by the axial position of the probe within the catheter can be read directly from this scale. Thus, the recording end of the catheter serves as the index for the scale 19.

A properly amplified voltmeter 20 is connected across the recording ends of the wires 10 and 11 to give instantaneous readings of the voltage induced between the electrodes 17 and 18. If a tracing of the indicated voltage is desired, then a recorder such as a Sanborn, which varies with time, may be used in place of the voltmeter 20.

To produce the necessary magnetic field a pair of identical coils 21 and 22 are mounted on a frame 23 so as to have a central longitudinal common axis and to be separated by an air gap of about two (2) feet. The coils are connected to a common 60 cycle A.C. source of electrical energy through a variable transformer 24.

Each coil has the same number of turns and the windings are so connected to the common source that opposite poles of the coils face each other. Since the coils have identical field strengths, a uniform magnetic field exists along the longitudinal axis across the air gap. As a result, the strength of the magnetic field is independent of the position of the probe with respect to the coils 21 and 22 as long as the probe remains within the air gap.

During catherizations which are routine when this probe is being used, it will be necessary to use a second catheter along with the catheter containing the probe in order to obtain pressure readings or to withdraw blood samples.

When the probe 9 is threaded into the catheter 2 prior to the catheterization, it is advanced to the measuring end of the catheter. When it reaches this point, the electrodes 17 and 18 are cautiously threaded through the grooves 6 and 7 cut in the side of the plug 4 in the end of the catheter. Since the probe has good longitudinal rigidity inside the catheter as it is advanced by pushing it at the external end of the catheter, the effect of the plug and its grooves is to separate the electrodes farther apart until each electrode branching out in a Y configuration contacts the inner surface of the vessel wall 25.

As discussed above, the scale 19 will be determined in advance from direct measurements of the distance between the electrodes as the probe is advanced, utilizing the same separating plug, outside the body. At the instant that the electrodes contact the inside of the arterial wall, a reading will be taken from the scale 19. It will be noted at what part of the cardiac cycle this reading is made by comparison with the simultaneous pressure curve of the pulmonary artery, if extreme accuracy is desired, and the variation in the internal diameter of the artery with cardiac cycle is to be taken into account. By advancing and retracting the probe several times in this manner, one can establish the maximum and minimum values of the internal diameter of the artery at different points in the cardiac cycle, and interpolate for values in between, since the internal diameter of the artery must vary in phase with the pressure.

Once these values have been determined, the probe is finally advanced so that snug contact is made at a time of maximum expansion of the vessel to insure that there is contact throughout the cardiac cycle between the electrodes and opposite points on the internal wall of the vessel. At the conclusion of the recording, the probe is retracted a few centimeters by gentle external traction until by checking the scale 19 on the probe, it is known that the whole assembly has been pulled back into the lumen of the catheter. The catheter is then removed as in any routine catheterization.

The purpose of the electrodes is to detect any EMF induced between them. The distance between the electrodes becomes L and is nearly the same as the internal diameter of the vessel, since the thickness of the electrodes and the encircling resin is of the order of one or two millimeters. The two piano wires conduct the small current between the electrodes, as a result of the ionic migration in the blood, to the external recorder 20.

When the subject is prepared for catheterization, the frame 23, with the coils 21 and 22 mounted on it, is positioned in such a way that the patient's chest lies in the air gap between the coils. The subject is positioned as carefully as possible, so that as nearly as can be determined, the common longitudinal axis of the coils traverses the main pulmonary artery. In practice, a slight lateral error in positioning will be of little concern, since the coils have such a large diameter that their common longitudinal axis can be accurately thought of as an imaginary cylinder rather than a line. Since the main pulmonary artery is nearly parallel to the anterior and posterior thoracic wall, it is necessary to incline the frame 23 supporting the coils so that frame which is parallel to the common magnetic longitudinal axis of the coils, appears to be perpendicular to the outer wall of the thoracic cage. This will establish near orthogonality of the magnetic field which is to induce the signal, to the flow of blood in the pulmonary artery. The magnetic line of force, effective in inducing an EMF in a non perpendicular situation, is equal to the magnetic field strength H times the sine of the angle between the magnetic flux line and the direction of motion. Thus:

$$H \text{ (effective)} = H \text{ (total)} \times \text{sine}$$

of the angle between the magnetic flux line and the direction of motion.

When perpendicularity exists, the angle becomes 90°. Since the sine of 90° is unity, $$H \text{ (effective)} = H \text{ (total)}$$

If an error of 20° (larger than expected) were made in the positioning of the coils with respect to the patient, the angle between the magnetic axis and the direction of flow would be 70°. Since the sine of 70° is .939, $$H \text{ (effective)} = .939 \, H \text{ (total)}$$

Thus it can be seen that with a very large error in electrode positioning, the H (effective) would still be only .06 H (total) less than the value actually used in the equation to solve for E. At small errors of positioning, the difference introduced would be of the order of .002 H (total) less than the value actually used in the equation.

The current delivered to the coils is controlled by the variable transformer 24, so that known amounts of current traverse each coil at any time. Prior to determinations of flow, measurement of H will be accomplished along the magnetic axis between the coils in the air gap by means of a search coil, snatch coil, or any other suitable magnetic measuring device. H may also be accurately predicted since I and the number of turns N are both known. Thus, the value of H will be determined in advance so that a known setting of the transformer will correspond to a known value of H along the magnetic axis.

Placing a subject in the air gap should have no effect on the value of H either with respect to its magnitude or direction, since the human organism being almost completely water has a negligible effect on a magnetic field passing through it. Of course, in addition to water, the organism consists of organic colloids which probably do not alter a line of magnetic force, and certain metals such as iron in small quantities or trace amounts. Although iron and some of the other metals present in the human body have ferromagnetic properties (they can bend a line of force or otherwise change its value at an interface), their quantity and distribution are insufficient to impart any ferromagnetic properties to the human organism, especially the thorax. Observations made by placing human blood in a magnetic field of the same order of magnitude as the one under consideration, completely support this contention. No observable change was noted in the magnitude or direction of the magnetic field when a large quantity (one pint) of blood was interposed between the source of the magnetic field and the measuring instrument. Of all the body fluids one might expect to exert a ferromagnetic effect, blood stands among the highest, due to its relatively high concentration of iron.

Another condition which must be fulfilled and which poses some difficulty is that the line L between the pickup electrodes 17 and 18 must be perpendicular to both the flow direction V and magnetic flux line H. By the very nature of the design of the probe, near orthogonality between V and L is established. As before, a small deviation from perpendicularity will introduce only a small error. The real difficulty is to establish perpendicularity between L and H. A small error here, by the same argument advanced before, will not be serious, but the chance of committing a large error exists. To overcome this, the probe 8 will be introduced into the catheter and advanced, once inside the pulmonary artery, as before. Even before the electrodes 17 and 18 of the probe contact the vessel wall 25 there will be a distance D between the electrodes. The value of D moves from a minimum as the probe emerges from the catheter to L when the tips contact the vessel wall. If advancement is stopped at some intermediate point and the magnetic field applied, an EMF will be induced:
where $$E = H \text{ (effective) } DV$$

As before:

$H$ (effective) = sine of the angle between $D$ and $H \times H$ (total)

This angle can be made to vary by rotating the catheter from the outside of the body. No ill effects should be associated with such a rotation since the electrodes are not yet in contact with the vessel wall. Rotations of this sort are done frequently during a catheterization. At some point during the rotation, D will become parallel to H. The angle between them will then be zero. The sine of zero degrees is zero, thus at that point H (effective) will be zero. When H (effective) is zero, the induced EMF across D will disappear, and the external recorder will indicate nothing. Careful rotation of the catheter from this position in either direction should produce an increasing reading on the external recorder as H (effective) increases. During the rotation, D will pass through a position perpendicular to H, and at this point the intervening angle will be 90° and its sine, unity. H (effective) will, as before be equal to H (total) which is its maximum possible value. Rotation beyond this point will lead to a smaller H (effective) by the same argument. Thus the induced SMF will increase to a maximum value when the probe is rotated through the position of perpendicularity and decrease again beyond that point. By carefully watching the external recorder and rotating the catheter with the probe in intermediate position D, the point of orthogonality is noted when the needle has its highest reading. The catheter is held at this point after a few determinations from both directions, and the probe advanced until D becomes L or contact with the wall has been made.

It must next be determined when the probe ends contact the inner vessel wall. As the probe is being advanced and after its perpendicularity has been assured as described above, an alternating current from a separate external source will be passed through one of the probe wires across the electrode blood gap and back to the outside by the opposite probe wire, this whole circuit path acting as one side of a Wheatstone bridge. The external side of the bridge will be balanced so as to have an impedance equal to that of the internal side of the bridge before vessel wall contact is made. The impedance around the internal portion of the bridge will remain constant even though the probe is being advanced, and the electrode distance is changing until the vessel wall contact is made.

By complex mathematical reasoning, it can be shown that small electrodes immersed in a relatively large volume of isotropic medium have an impedance which is constant and independent of the separation between them. It has been shown above that the two small electrodes are electrically equivalent to two concentrically charged spheres, thus the laws governing such spheres applies here. Each electrode is equivalent to the single inner charged sphere. Each is considered to have an outer imaginary charged sphere surrounding it with a radius equal to infinity. It is then shown that the two large outer spheres, since they possess infinite dimension, can be conveniently coalesced into one without affecting the mathematical result. The equation so derived from this arrangement shows that impedance is independent of the distance between the two smaller spheres, or in this case the electrodes.

Experimentally, it has been found that when electrode separation becomes an order of magnitude higher than the surface area of the electrode, the above law applies. At electrode separations of the same order of magnitude, the concentric sphere law is no longer applicable, and impedance varies with the separation. In the apparatus under consideration, electrode diameters are approximately 1/10,000 of an inch. To calculate surface area of the electrode, it is necessary to square ½ of the diameter and multiply by Pi. Performing this, the area is seen to be Pi/400,000 or approximately $7.85 \times 10^{-6}$ square inches. The order of magnitude of separation of the electrodes will be in the range of ¼ inch–1 inch. Thus, at ¾ inch of separation, it can be seen that separation is approximately $10^5 \times$ the surface area of an electrode. Certainly, such a large ratio of values fulfills the conditions so that the concentric sphere law applies. Once the outer portion of the probe electrodes contact the inner vessel wall, however, the system is radically changed.

When both electrodes are each touching the opposite wall, several new current paths now exist between the electrodes. There are the direct and indirect paths through the blood, and a circular path around the vessel wall. In addition, there may be any number of current paths which initially start in the vessel wall and at some point cross back into the blood traveling the blood route from there to the opposite electrode. The electrical conductivity of the tissue which makes up the vessel wall is much less than blood, and the effect of this contact is the same as adding one or a number of parallel circuits suddenly to one side of a balanced Wheatstone bridge. It changes the impedance along the internal side of the bridge suddenly and drastically, thus unbalancing the bridge and allowing a current to move across the bridge shortcut through the bridge recorder. In other words, the needle on the Wheatstone bridge galvanometer will suddenly jump when vessel wall contact is made, and as described before, a reading from the distance scale on the probe will be immediately made to arrive at L. After the required number of determinations are made, the external AC power source and bridge circuit will be disconnected and the probe will be used purely for recording induced EMF.

There are several ways in which the problem of transformer induced EMF may be eliminated. One method calls for feeding an equal but 180° out of phase voltage to the transformer induced EMF, into one of the final detection stages. The net effect of such a procedure is to cancel the transformer induced EMF so that only the flow induced EMF is present in the recording. It is possible to match these two EMF's exactly by arranging the system so that the counterinduced voltage is itself triggered and controlled in amplitude by the transformer induced EMF.

Another method has been to sample the incoming signal at definite intervals by means of some sort of gating circuit in the detection system. The gated amplifier is usually synchronized by the magnet supply voltage and samples the signal once each cycle. Since as mentioned before, the transformer induced EMF differs from the flow induced EMF by 90°, it is possible to sample the signal at that point when transformer EMF is passing through the base line and undergoing its greatest rate of change, and flow induced EMF is at its maximum or minimum value and undergoing its smallest change. If the sampling interval is placed so that transformer induced EMF passes through zero exactly midway through the sampling interval, the integrated value of the transformer induced EMF over the whole sampling interval is also zero. Thus in this setup, integration is electronically performed, and the only signal appearing on the tracing is the flow induced EMF.

The magnetic field established by this invention is of magnitude sufficient to induce an EMF in flowing normal saline or tap water of the order of $10^{-3}$ volts. When recording values in this voltage range, fairly large, comparatively crude recording instruments may be used which will not respond to 60 cycle currents but only to slower alterations in voltage. Since the transformer induced EMF will be 60 cycle, while the flow induced EMF will vary between 40 to 110 cycles per minute depending upon the pulse rate, the transformer induced EMF can be removed mechanically in the recording instruments, since many of them cannot respond to EMF changes greater than 125 or 150 cycles per minute. If it becomes desirable to use much smaller magnetic intensities thereby producing a flow induced EMF of the order of $10^{-8}$ to $10^{-6}$ volts, much more sophisticated amplification and recording systems must be used. Such sophisticated systems are completely capable of picking up transformer induced EMF, therefore a gating amplifier must be used.

Thus it can be seen that the present invention discloses a novel and effective method and apparatus for measuring blood flow through a vessel or artery to determine cardiac output. The apparatus is simple in construction yet easy to use and employs the known medical procedure of catheterization. The present invention adds another instrument and method to the clinician's group of diagnostic measuring devices.

It will be understood that this invention is susceptible to modification in order to adapt it to different usages and conditions, and accordingly, it is desired to comprehend such modifications within this invention as may fall within the scope of the appended claims.

What is claimed is:

1. An apparatus for measuring cardiac output, comprising a cardiac catheter for insertion into a blood vessel in which the flow of blood is to be measured, a probe slidably positioned within said catheter and comprising a pair of spaced apart electrodes at an end of said catheter, means within said catheter for spacing said electrodes further apart as said probe is advanced outwardly of said catheter end, means for establishing a electromagnetic field through the blood vessel in which the blood flow is to be measured whereby the flow of blood through said magnetic field will induce and EMF between said electrodes, and means connected to said probe for measuring an EMF induced between said electrodes.

2. An apparatus for measuring cardiac output, comprising a cardiac catheter with one end being insertable into a blood vessel in which the flow of blood is to be measured, a probe within said catheter with one end of said probe having a pair of spaced electrodes at said one end of said catheter and the other probe end extending outwardly of said catheter, a pair of similar coils spaced on opposed sides of said blood vessel and connected to a source of electrical energy for establishing an electromagnetic field through said blood vessel in the vicinity of said electromagnetic field will induce an EMF between said electrodes, and a voltmeter connected to said probe other end across said electrodes to measure the EMF generated therebetween.

3. In an apparatus for measuring the flow of blood in a blood vessel to determine cardiac output, the combination of a cardiac catheter with one end being open and said one end being insertable into a blood vessel, a pair of electrically conductive wires within said catheter with the pair of wire ends within said catheter one end having electrodes thereon to define a probe, and means within said catheter one end for urging said electrodes apart into spaced relationship exteriorly of said catheter as said probe is advanced into said catheter.

4. In an apparatus for measuring the flow of blood in a blood vessel to determine cardiac output, the combination of a cardiac catheter with one end being open, a pair of individually insulated electrically conductive wires extending into said catheter and being movable therein, there being electrodes on the ends of said wires within said catheter, a plug closing said open end of the catheter and having a pair of opposed longitudinally extending grooves on the peripheral surface thereof, said electrodes and wire ends being positioned in said plug grooves so that advancement of said wires into the catheter will cause said electrodes to emerge from said catheter end in spaced relation with each other.

5. In an apparatus for measuring the flow of blood in a blood vessel to determine cardiac output, the combination of a cardiac catheter with one end being open, a pair of individually insulated electrically conductive wires extending into said catheter and being movable therein, there being electrodes on the ends of said wires within said catheter, an outer layer of insulating material surrounding said wires to retain said wires in a single cable with portions of the ends of said wires within said catheter being free of said outer layer, a plug closing said open end of the catheter and having a pair of opposed longitudinally extending grooves on the peripheral surface thereof, said electrodes and wire ends being positioned in said plug grooves so that advancement of said wires into the catheter will cause said electrodes to emerge from said catheter end in spaced relationship to each other.

6. In an apparatus for measuring the flow of blood in a blood vessel to determine cardiac output, the combination of a cardiac catheter with one end being open, a pair of individually insulated electrically conductive wires extending into said catheter and being movable therein, there being electrodes on the ends of said wires within said catheter, an outer layer of insulating material surrounding said wires to retain said wires in a single cable with portions of the ends of said wires within said cather being free of said outer layer, a plug closing said open end of the catheter and having a pair of opposed longitudinally extending grooves on the peripheral surface thereof, the distance between said plug grooves being greater than the distance between the wires covered with said outer layer of insulation, said electrodes and wire ends being positioned in said plug grooves so that advancement of said wires into the catheter will cause said electrodes to emerge from said catheter end in spaced relationship to each other.

7. A method of measuring cardiac output, and comprising the steps of establishing a magnetic field through a blood vessel in which the flow of blood is to be measured, measuring the internal diameter of the blood vessel at the magnetic field to determine the cross-sectional area of the vessel at that point, inserting a pair of spaced electrodes into the vessel that the point through which the magnetic field passes and measuring the EMF induced between the spaced electrodes by the blood flowing through the magnetic field to determine the rate of flow of the blood at that point.

References Cited

UNITED STATES PATENTS

| | | | |
|---|---|---|---|
| 3,075,515 | 1/1963 | Richards | 128—2.05 |
| 3,078,841 | 2/1963 | Brownson | 128—2.05 |
| 3,189,023 | 6/1965 | Salz et al. | 128—2.05 |
| 3,191,119 | 6/1965 | Singer | 128—2.05 X |
| 3,242,729 | 3/1966 | Keller | 73—194 |

RICHARD A. GAUDET, *Primary Examiner.*

SIMON BRODER, *Examiner.*